United States Patent [19]
Hayo

[11] 3,815,130
[45] June 4, 1974

[54] NEAR FIELD TARGET DISCRIMINATION AND INTRUSION DETECTION SYSTEM

[75] Inventor: Frank J. Hayo, Santa Barbara, Calif.

[73] Assignee: Metrophysics, Inc., Santa Barbara, Calif.

[22] Filed: Aug. 2, 1971

[21] Appl. No.: 167,940

[52] U.S. Cl. .............................................. 343/5 PD
[51] Int. Cl. ............................................. G01s 9/02
[58] Field of Search .. 343/5 PD; 340/258 R, 258 A, 340/258 B

[56] References Cited
UNITED STATES PATENTS
2,656,527  10/1953  Tillman........................... 343/5 PD
3,005,194  10/1961  Goodell et al................. 343/112 CA Primary Examiner—Stephen C. Bentley
Attorney, Agent, or Firm—Eckhoff, Hoppe, Slick, Mitchell and Anderson

[57] ABSTRACT

An intrusion detector circuit comprising multiple antennas to detect intrusion and yet eliminate signals attributable to near antenna movements which produce false alarms.

7 Claims, 4 Drawing Figures

INVENTOR.
FRANK J. HAYO

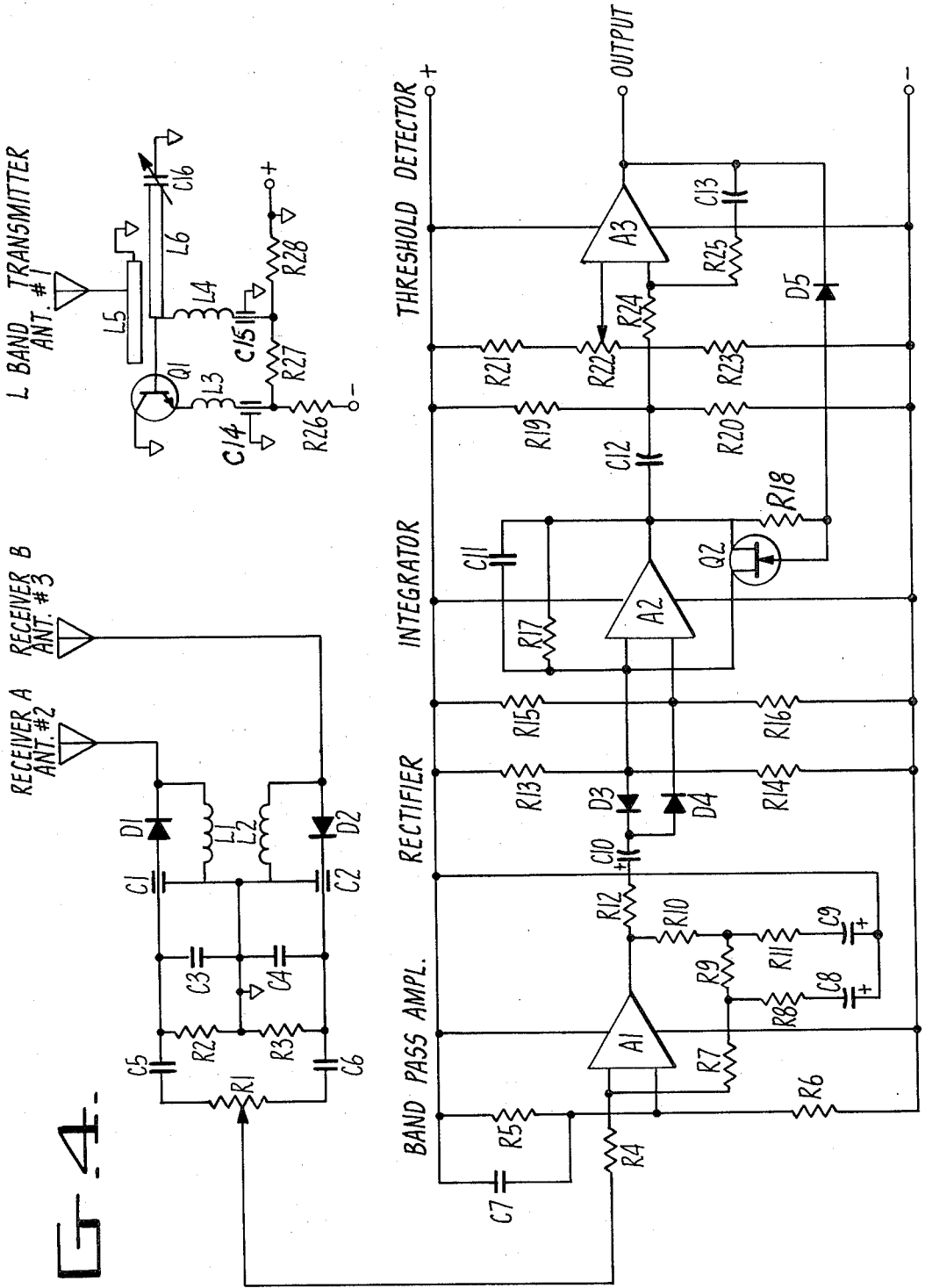

NEAR FIELD TARGET DISCRIMINATION AND INTRUSION DETECTION SYSTEM

This invention relates to intrusion detector circuits capable of producing an alarm upon the entrance or intrusion of a body into a protected zone. The invention more particularly relates to the elimination of erroneous alarms attributable to the movements of vegetation or small animals in the near vicinity of the detector.

In brief, the present invention employs at least one transmitting antenna and a pair of receiving antennas, the transmitting and one receiving antenna having essentially the same radiation pattern that covers the horizontal area to be protected from intrusion. The second receiving antenna has a radiation pattern within the pattern of the others and providing field strength over only a small portion of the area to be protected (the near-antenna suppression zone). A high frequency transmitter connected to the transmitting antenna sends out a signal which may be reflected by moving objects within the area to be protected, and reflected signals are received by each of the pair of receiving antennas connected, respectively, to a pair of detectors having outputs of opposite polarity connected to a baseline balance circuit.

It will be apparent that any movement within the near-antenna suppression zone generates output voltages in both detectors which, due to the opposite polarity, cancel each other so that no alarm signal is produced. However, any movements outside the near-antenna suppression zone but within the protected area will produce a significant signal in the detector connected to that receiving antenna having essentially the same radiation pattern as the transmitting antenna. This signal is then fed through the baseline balance circuit, amplified, rectified and integrated. The integrator is automatically reset as a function of time and/or frequency count, and the integrated value triggers an alarm output when it exceeds the preset level required by a threshold detector.

In the preferred embodiment, the transmitting antenna is connected to a high frequency L-band transmitter which can operate in a pulsed mode for relatively low power consumption. The alarm output is then used to energize a second transmitter for broadcasting the alarm to one or more remote receivers.

Thus, it will be apparent that a principal object of the present invention is to provide an intrusion detector circuit that avoids erroneous alarms attributable to moving objects which are proximate to a pair of receiver antennas.

Another object is to provide an intrusion detector circuit of the kind described and having a pair of receiving antennas, one of which covers the area to be protected from intrusion, the other having a radiation pattern within the pattern of the first and providing field strength over only a small portion of the area to be protected, and more particularly wherein the signals received and detected by the two antennas cancel each other so that no alarm signal is produced when the signals are caused by a moving object in the near-antenna suppression zone.

Other objects of this invention will become apparent in view of the following detailed description and the accompanying drawings.

In the drawings forming a part of this application,

FIG. 4 is a schematic diagram of electrical circuitry useful for practicing the invention.

Figure 1:
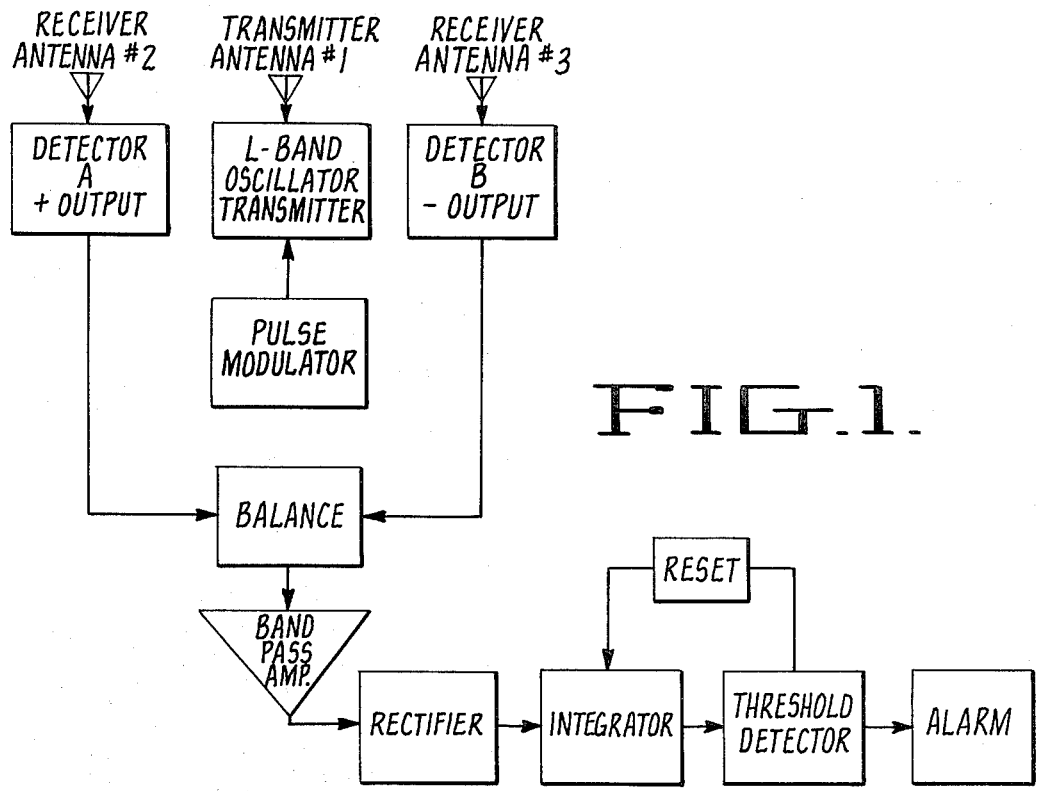
FIG. 1 is a block diagram of a motion sensor constructed in accordance with the invention.

Referring to FIG. 1 in particular, an antenna 1 connects to a high frequency L-band transmitter which can be operated in a pulsed mode by a pulsing circuit. A pair of antennas 2 and 3 connect to detector circuits A and B, respectively, the output of detector A being positive and the output of detector B being negative. The outputs of detectors A and B are then fed through a baseline balance circuit which connects to a band pass amplifier, a rectifier, an integrator and a threshold detector circuit.

Figure 2:
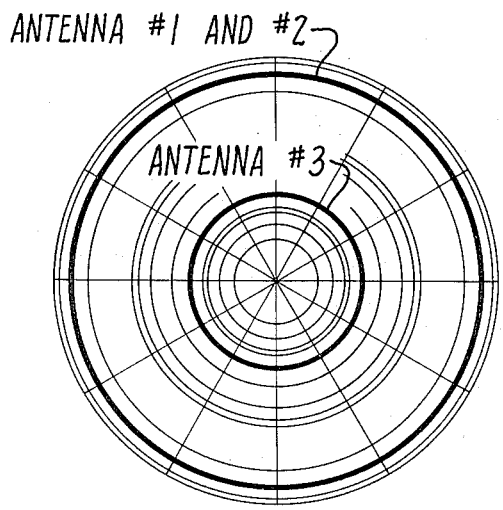
FIG. 2 illustrates exemplary antenna patterns for three antenna used with this invention.

FIG. 2 illustrates the radiation patterns for the preferred arrangement of antennas. Antennas 1 and 2 have essentially identical radiation patterns and cover the horizontal circular area to be protected from intrusion. Antenna 3, however, is designed to provide field strength over only a small circular portion of the area (the near-antenna suppression zone); and the field strength of antenna 3 falls off very rapidly outside this small area. Thus, any movement within the near-antenna suppression zone generates output voltages in both detectors A and B which, due to the opposite polarity, cancel each other. Conversely, movement within the field of antennas 1 and 2 but outside the area covered by antenna 3 will produce a significant signal in detector A only.

Figure 3:
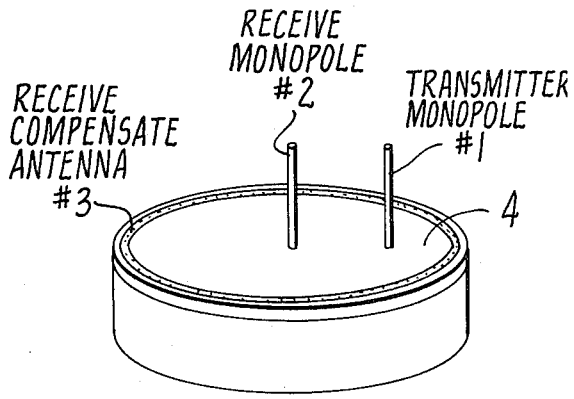
FIG. 3 is a perspective view of a preferred antenna arrangement that may be used with the invention.

Antenna design is a key factor in achieving optimum performance. Omindirectional coverage is obtainable with the system described by using a one-fourth wavelength monopole antenna for antennas 1 and 2 and a ring type antenna for antenna 3. The ring antenna is designed to cover a small circular area with sensitivity that decreases rapidly outside this area. The general arrangement of antennas 1, 2 and 3 is shown in FIG. 3.

One specific arrangement of antennas suitable for practicing this invention employs a 0.18 wavelength spacing between antennas 1 and 2 and a conducting ring 0.7 wavelength in diameter that is fitted symmetrically about antenna 2 and above a dielectric slab 4. The ring, as an antenna, launches energy into the dielectric which forms a surface wave. The field amplitude emanating from the ring is a combination of radiation from the ring and evanescent fields loosely bound to the energy in the dielectric. The evanescent fields originate at the dielectric-air interface, are proportional to the field amplitude at this interface and decay exponentially with distance from their origin. The combined effect of the radiated and evanescent fields from antenna 3, when fed so that they subtract from the field of the receiving monopole antenna 2, is a decrease in sensitivity close to the detectors.

It will be apparent that certain design tradeoffs are necessary in the selection of antennas and their arrangement. For example, it is necessary to compromise directional coverage when placing transmit monopole antenna 1 so that it couples approximately the same power to receive monopole antenna 2 and ring antenna 3. It is also necessary to make the diameter of ring antenna 3 as small as possible to minimize total package size of the detector yet large enough for adequate electrical performance. Based on the latter consideration a ring antenna 4.5 inches in diameter has given satisfactory electrical performance although physically smaller configurations are feasible.

FIG. 4 illustrates a preferred embodiment in circuitry for practicing this invention. The oscillator is of the fundamental frequency type designed for an L-band transmitter and having a single "overlay" type transistor that operates in a ground-collector configuration; and all of the R-F components except the transmitter, tuning capacitor and bypass capacitors may be etched on a teflon dielectric microstripline board. The frequency determining circuit for the transmitter connects to the base of the transistor, and a fine tuning capacitor is provided. A pair of one-fourth wavelength chokes couple the emitter to the base, and a second tuned circuit comprising a pair of striplines couple the oscillator to transmitting antenna 1. Optimum coupling is obtained by a tap located directly under the transmitting antenna. The L-band oscillator may be pulsed "on" by conventional pulsing circuits for intermittent battery operation.

Preferred embodiments of detectors A and B, a baseline balance circuit, band pass amplifier, rectifier, integrator and threshold detector are also shown in FIG. 4. Inasmuch as the operation of each unit is essentially conventional, no further description of this circuit is considered necessary. However, an operational circuit for use with the invention described may be constructed by selecting the various electrical components by value and/or designation as shown in the following table:

| | | | |
|---|---|---|---|
| A1 | A741 | D3 | HP5082-2800 |
| A2 | A741 | D4 | HP5082-2800 |
| A3 | A741 | D5 | 1N482 |
| C1 | 180 pF | L1 | ¼ λ choke |
| C2 | 180 pF | L2 | ¼ λ choke |
| C3 | 15 μF | L3 | ¼ λ choke |
| C4 | 15 μF | L4 | ¼ λ choke |
| C5 | 15 μF | L5 | ¼ λ resonator |
| C6 | 15 μF | L6 | ¼ λ resonator |
| C7 | 10 μF | Q1 | 2N5108 |
| C8 | 10 μF | Q2 | 2N4339 |
| C9 | 10 μF | R1 | 50KΩ |
| C10 | 4.7 μF | R2 | 500KΩ |
| C11 | 4.7 μF | R3 | 500KΩ |
| C12 | 120 μF | R4 | 100KΩ |
| C13 | 0.68 μF | R5 | 200KΩ |
| C14 | 180 pF | R6 | 200KΩ |
| C15 | 180 pF | R7 | 510KΩ |
| C16 | 1.5 pF variable | R8 | 30KΩ |
| D1 | HP5082-2577 | R9 | 1MΩ |
| D2 | HP 5082-2577 | R10 | 1MΩ |
| R11 | 30KΩ | R20 | 470KΩ |
| R12 | 100KΩ | R21 | 10KΩ |
| R13 | 20.5KΩ | R22 | 20KΩ |
| R14 | 20.5KΩ | R23 | 10KΩ |
| R15 | 20.5KΩ | R24 | 820KΩ |
| R16 | 20.5KΩ | R25 | 47KΩ |
| R17 | 4.7MΩ | R26 | 22Ω |
| R18 | 330KΩ | R27 | 3.6KΩ |
| R19 | 470KΩ | R28 | 9.1KΩ |

In operation, some R-F power is directly coupled to antennas 2 and 3 by reason of the proximity of the three antennas. This power is phase compared in detectors A and B with any signal which originated from antenna 1 but is reflected by a moving body. Inasmuch as the output of detector A is positive and the output of detector B is negative, any movement within the near-antenna suppression zone generates output voltages in both detectors and tend to cancel each other. The point of balance (or cancellation of outputs) may be adjusted with the variable potentiometer in the baseline balance circuit. Thus, movements outside the near-antenna suppression zone but yet within the area to be protected produce a significant signal in detector A alone. This output signal is fed through the baseline balance circuit and is amplified in the band pass amplifier. The amplified voltage is then rectified through a pair of diodes which feed direct and inverted inputs to the amplifier of the integrator, and the integrator is automatically reset as a function of time and/or frequency count by a reset circuit including a FET.

The threshold detector essentially comprises a comparator amplifier which generates an alarm signal when the output of the integrator exceeds the level of a threshold signal which may be preset or adjusted by means of a potentiometer. The integrator and threshold detector are coupled by a capacitor selected to minimize integrator drift and low-frequency noise.

An alarm signal generated by the threshold detector may be used to operate numerous alarm devices. For example, the alarm signal may be used to turn on a second oscillator and transmit a warning signal to remote locations, or an audible alarm may also be energized.

Although preferred embodiments of this invention have been illustrated and described, various modifications and changes may be made without departing from the spirit of the invention or the scope of the attached claims, and each such modification and change is contemplated.

What is claimed is:

1. An intrusion detection circuit comprising:
   means for transmitting radio frequency signals into an area to be protected from intrusion, whereby moving objects within the area produce reflected signals;
   first means for detecting reflected signals within the area to be protected from intrusion and having a field strength and radiation pattern that essentially covers the area to be protected;
   second means for detecting reflected signals within the area to be protected from intrusion but having a field strength and radiation pattern that covers only a small portion of the area to be protected; and
   means responsive to the reflected signals detected by said first and second means for issuing an alarm signal when the signal detected by the said first means exceeds that detected by said second means by a preset threshold level.

2. An intrusion detection circuit comprising:
   first and second antennas having radiation patterns that cover an area to be protected from intrusion,
   a third antenna having a radiation pattern within the patterns of said first and second antennas but providing field strength over only a small portion of the area to be protected,
   means including an oscillator connected to said first antenna for transmitting radio frequency power into the area to be protected from intrusion, whereby moving objects within the area produce reflected signals that may be received by said second and third antennas,
   and means including detectors responsive to the reflected signals received by said second and third antennas for issuing an alarm signal when the signal received by said second antenna exceeds that received by said third antenna by a preset threshold level.

3. An intrusion detection circuit comprising:

first and second antennas having essentially the same radiation pattern covering the horizontal area to be protected from intrusion, a third antenna having a radiation pattern within the patterns of said first and second antennas and providing field strength over only a small portion of the area to be protected, means including an oscillator connected to said first antenna for transmitting radio frequency power into the area to be protected from intrusion, whereby direct signals and signals reflected by moving objects within the area may be received by said second and third antennas, the phase of said direct signal being a reference for reflected signals, first and second detectors connected to said second and third antennas, respectively, the outputs of said detectors having opposite polarity, and means responsive to the combined outputs for issuing an alarm signal when the combined outputs exceeds a preset threshold level.

4. The intrusion detection circuit of claim 3, said last named means comprising a balance circuit connected to said first and second detectors, and a band pass amplifier connected to said balance circuit, means for rectifying and integrating the output of said band pass amplifier including means for periodically resetting the integrated output signal, and threshold detector means for triggering an alarm whenever the integrated output signal exceeds a preset threshold level.

5. The intrusion detection circuit of claim 3, the radiation patterns of said second and third antennas being omnidirectional in the horizontal plane and substantially concentric relative to each other.

6. The intrusion detection circuit of claim 3, the radiation patterns of said first, second and third antennas being omnidirectional and substantially concentric relative to each other.

7. An intrusion detection circuit comprising:

first and second antennas having essentially the same radiation pattern covering the horizontal area to be protected from intrusion;

a third antenna having a radiation pattern with the patterns of said first and second antennas and providing field strength over only a small portion of the area to be protected, a high frequency transmitter connected to said first antenna, means connecting radio frequency power to said second and third antennas, the phase of said radio frequency power being a reference for reflected signals transmitted from said first antenna and received by said second and third antennas, first and second detectors connected to said second and third antennas, respectively, the outputs of said detectors having opposite polarity, means connecting the outputs of said first and second detectors to a base line balance circuit, a band pass amplifier connected to said balance circuit, means for rectifying and integrating the output of said amplifier, and means for periodically resetting the integrated signal.

* * * * *